July 6, 1926.　　　　　　　　　　　　　　　1,591,182
R. J. REANEY
WINDSHIELD CLEANER
Filed Jan. 28, 1925　　　　　　2 Sheets-Sheet 2

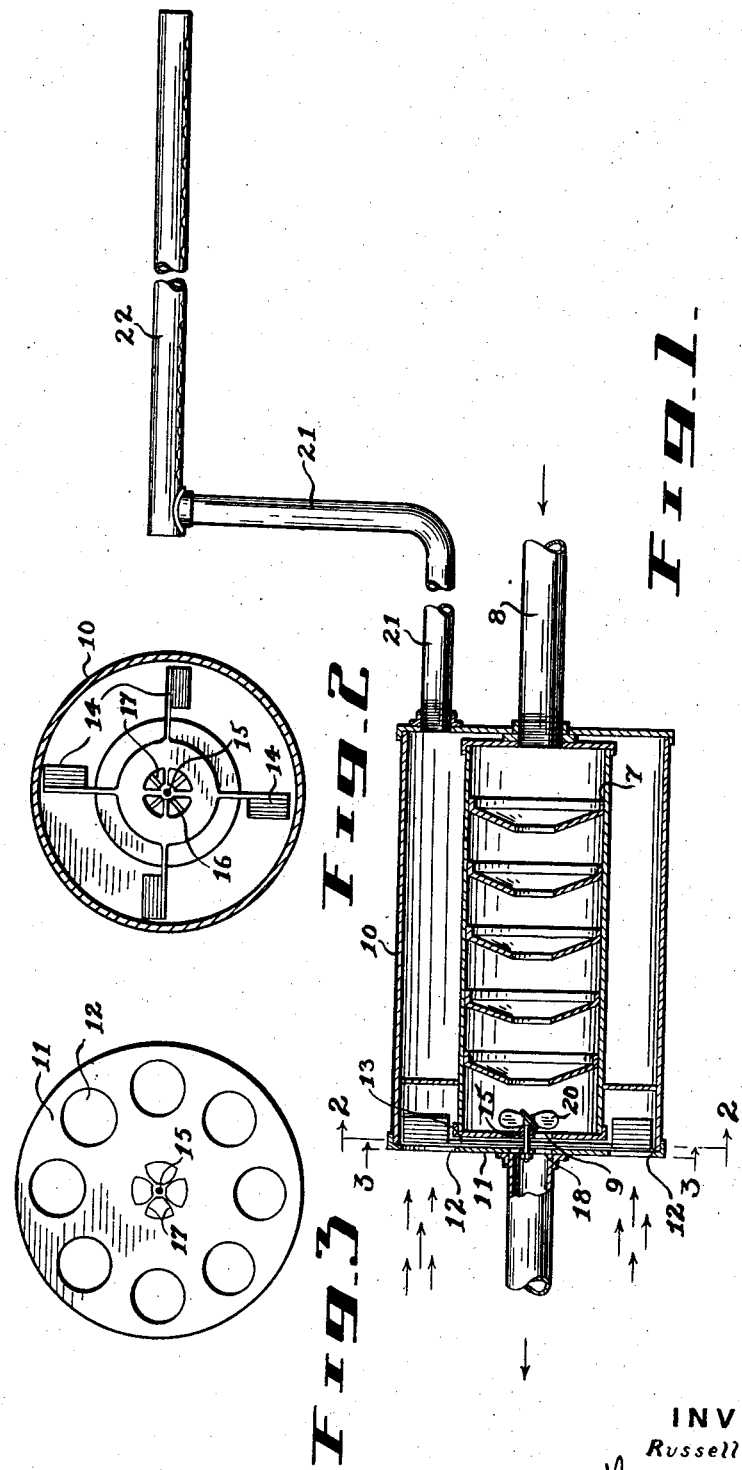

INVENTOR
Russell J. Reaney
BY Harold D. Penney
HIS ATTORNEY

Patented July 6, 1926.

1,591,182

UNITED STATES PATENT OFFICE.

RUSSELL J. REANEY, OF OTTAWA, ONTARIO, CANADA, ASSIGNOR TO REANEY LIMITED, OF OTTAWA, CANADA.

WINDSHIELD CLEANER.

Application filed January 28, 1925. Serial No. 5,406.

The invention relates to improvements in a windshield cleaner for automobiles and the like and contemplates the utilization of heated air in the accomplishment of this purpose.

An object is to provide a perforated tube applied laterally to the top of the windshield by which a multitude of miniature streams of warm air are projected on the glass.

Another object is the utilization of a stream of air heated by but free from the products of combustion.

A further object of the invention resides in a windshield cleaner of the character described wherein streams of warm air are projected on the outside of the windshield by a perforated tube applied laterally thereto that is fed by a pipe from a cylinder surrounding the muffler in the exhaust line, the stream of warm air being forced to said perforated nozzle by an exhaust line driven fan.

To the accomplishment of these and related objects the invention consists of the novel construction, combination and arrangement of elements as shall be hereinafter more fully described, illustrated in the drawings forming a part of this disclosure and pointed out in the claims hereunto appended.

In these drawings, wherein like characters designate like parts throughout the several views, Fig. 1 is an elevation of the device, parts being shown in section;

Figs. 2 and 3 are sections as on lines 2—2 and 3—3 respectively of Fig. 1;

Figure 4:
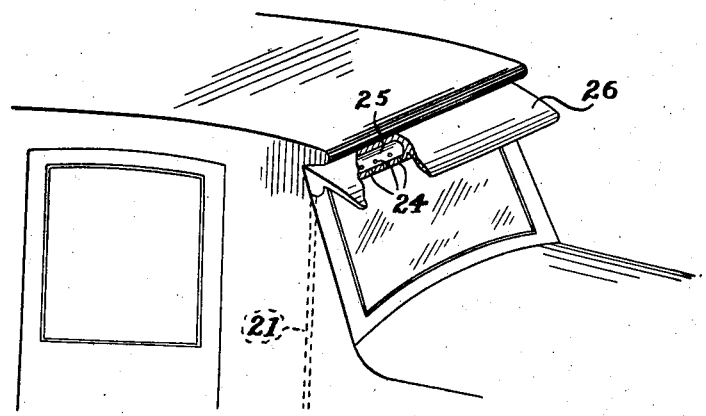
Fig. 4 is a perspective of an automobile windshield to which a modified form of the invention has been applied.
Figure 5:
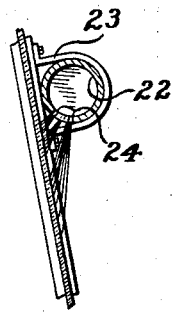
Fig. 5 is a section through the windshield and that part of the device applied thereto.
Figure 6:
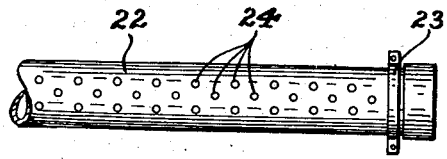
Fig. 6 is a detail of the perforated pipe mounted transversely of the windshield.

The use of mechanical wipers for keeping a windshield clean has only met the need in part and the clearing of but a small piece of the glass sufficient to give the driver a view of the road immediately ahead is as far as the development of this type of cleaner seems practical. And too, clouding has presented a difficulty for which no satisfactory remedy is offered as the wiping of both inside and outside of the glass requires a relatively complicated piece of construction.

The invention by the use of the hereindescribed cleaner aims to provide a device that will effectively prevent the clouding of the windshield and provide a clear vision glass throughout the entire length thereof.

Treated generally the device comprises a cylindrical casing mounted concentric with and about the exhaust muffler, an exhaust driven fan forcing the muffler heated air up a communication pipe therefrom and a perforated nozzle or pipe mounted transversely of the top of the windshield to which it is laterally applied and with which said communication pipe terminates.

Particular reference is now had to the drawings in which 7 indicates a muffler of usual design with inlet pipe 8 and an outlet opening 9. A cylindrical casing 10 encloses said muffler having a rear end 11 in which a plurality of openings 12 are provided in a circle concentric with and adjacent the periphery of the said end.

The casing end 11 and the rear end of the muffler 7 are spaced from each other and a fan 13 inserted therebetween, the blades 14 of which ride between the muffler and casing with which space the circle of openings 12 registers. A shaft 15 on which the hub 16 of said fan is fixed is supported by radial webs 17 in the axial outlet opening 9 of the muffler and a registering opening 18 in the end 11 of the casing; a continuation 19 of the exhaust pipe may extend from said latter opening. To the end of said shaft 15 within the muffler a small propeller 20 about equal in diameter to the opening 9, is fixed that is adapted for rotation by the force of the exhaust.

Threaded to the forward end of the casing 10 adjacent the perimeter is a pipe 21 that communicates with a nozzle pipe 22 mounted horizontally on the windshield of an automobile to which it is laterally applied, suitable brackets 23 being used for this purpose. Between the bottom of the nozzle pipe and the side adjacent the windshield, rows of small perforations 24 are staggered.

In Fig. 4 I have illustrated a modified form of my nozzle 25 which is incorporated in the base of a sun-visor 26, the concealed parts of the device being as hereinbefore described.

It will be obvious that the device may be made a part of the car with the transverse nozzle formed integral with the windshield supports and the communication pipe housed therein or if found desirable in practice, a communication hot air pipe may connect with both ends of the nozzle.

In use, the exhaust products of combustion passing through and out of the muffler heat the air in the surrounding casing and rotate the propeller in the outlet opening thereby actuating the fan in the inlet end of the casing that forces the warm air up the communication pipe and out the nozzle blowing in warm streams on the outside of the windshield.

It will thus be seen that any snow or rain falling on the glass will be vaporized and a clear vision at all times maintained.

From the foregoing description taken in connection with the accompanying drawings, it will be manifest that a windshield cleaner is provided which will fulfill all the necessary requirements of such a device, but as many changes could be made in the above description and many apparently widely different embodiments of my invention constructed within the scope of the appended claims without departing from the spirit or scope thereof, it is intended that all matters contained in the said accompanying specification and drawings shall be interpreted as illustrative and not in a limited sense.

What I claim as new is:—

1. An automobile windshield cleaner comprising a nozzle associated with the windshield, an exhaust line heater connected therewith and an exhaust line operated means for creating a draught to force a stream of warm air from said heater to the nozzle.

2. In a windshield cleaner, the combination with an automobile of a casing surrounding the muffler, an exhaust driven fan therein, a nozzle applied laterally to the windshield adapted to project streams of warm air thereon, and a communication pipe thereto from said heater.

3. In a windshield cleaner, the combination with an automobile of a casing surrounding the muffler, an exhaust driven fan therein, a pipe therefrom extending to the windshield and a nozzle having rows of staggered perforations on the lower and inner side connected therewith and applied laterally to the top of the windshield adapted to project streams of warm air thereon.

4. An automobile windshield cleaner comprising a nozzle associated with the windshield, an air heater associated with the exhaust line of the automobile, a communication means to the nozzle therefrom and an exhaust actuated blast fan operating in said air heater and adapted to create a draft of heated air, projecting the same through the said nozzle.

5. In a windshield cleaner the combination with an automobile of a casing surrounding the muffler, inlet openings in one end thereof, an outlet opening in the remote end, a suction fan rotatable in said casing near said inlet openings, an axle therefor, a second fan on said axle adapted for actuation by the exhaust passing out of said muffler, a pipe from said outlet opening extending to the windshield and a nozzle having staggered rows of perforations on the lower and inner side, connected therewith and applied laterally to the top of the windshield.

6. A device of the character described comprising, in combination with an automobile, a sun visor having a hollow and perforated transverse base, a casing surrounding the muffler, a communication to said visor base therefrom and a fan rotatable in said casing actuated by the exhaust passing out of said muffler adapted to drive the air in said casing to said visor, substantially as described.

In testimony whereof I hereunto affix my signature.

RUSSELL J. REANEY.